(12) United States Patent
Hoehn et al.

(10) Patent No.: US 11,060,447 B2
(45) Date of Patent: Jul. 13, 2021

(54) CHARGING DEVICE WITH A WASTEGATE VALVE DEVICE

(71) Applicant: BMTS Technology GmbH & Co. KG, Stuttgart (DE)

(72) Inventors: Alexander Hoehn, Altbach (DE); Matthias Kaczorowski, Stuttgart (DE); Steffen Kurz, Steinenberg (DE); Felix Scheerer, Schorndorf (DE); Fritz Schlegel, Kornwestheim (DE)

(73) Assignee: BMTS Technology GmbH & Co. KG

( * ) Notice: Subject to any disclaimer, the term of this patent is extended or adjusted under 35 U.S.C. 154(b) by 0 days.

(21) Appl. No.: 16/513,692

(22) Filed: Jul. 16, 2019

(65) Prior Publication Data
US 2020/0025061 A1    Jan. 23, 2020

(30) Foreign Application Priority Data

Jul. 17, 2018    (DE) .................. 10 2018 211 898.1

(51) Int. Cl.
*F02B 37/18*        (2006.01)
*F16K 1/20*         (2006.01)

(52) U.S. Cl.
CPC .......... *F02B 37/186* (2013.01); *F16K 1/2014* (2013.01)

(58) Field of Classification Search
CPC ........ F02B 37/18; F02B 37/186; F01D 17/10; F01D 17/105; F01D 17/146; F02C 9/18; F05D 2220/40; Y02T 10/144; F16K 1/2014
See application file for complete search history.

(56) References Cited

U.S. PATENT DOCUMENTS

| | | | | |
|---|---|---|---|---|
| 2014/0174077 | A1* | 6/2014 | Palaniyappan | F02B 37/183 60/602 |
| 2015/0147162 | A1* | 5/2015 | Stilgenbauer | F02B 37/186 415/145 |
| 2017/0234435 | A1* | 8/2017 | Hermann | F01D 17/105 60/602 |

FOREIGN PATENT DOCUMENTS

| | | |
|---|---|---|
| DE | 10 2012 216 893 A1 | 4/2014 |
| JP | S56-097530 U | 8/1981 |
| JP | H06-043227 U | 6/1994 |

OTHER PUBLICATIONS

English abstract for JPH6-43227U.
English abstract for DE-102012216893.

* cited by examiner

*Primary Examiner* — Jesse S Bogue
*Assistant Examiner* — Loren C Edwards
(74) *Attorney, Agent, or Firm* — Fishman Stewart PLLC

(57) ABSTRACT

A charging device may include a turbine housing and a wastegate valve device. The wastegate valve device may include a flap, a spindle arm, a wastegate spindle, an axial stop, and a lever arm non-rotatably attached to the wastegate spindle. The wastegate spindle may be rotatably mounted in a bushing disposed on the turbine housing. A wastegate duct may be disposed in the turbine housing. The wastegate duct may have a duct aperture enclosed by a valve seat. The duct aperture, when in a closed state, may be closed by the flap of the wastegate valve device. A sealing face of the flap may be defined by a sequence of at least two conical peripheral surfaces arranged next to one another and each having a different inclination.

21 Claims, 3 Drawing Sheets

CHARGING DEVICE WITH A WASTEGATE VALVE DEVICE

CROSS-REFERENCE TO RELATED APPLICATIONS

This application claims priority to German Patent Application No. DE 10 2018 211 898.1, filed on Jul. 17, 2018, the contents of which are hereby incorporated by reference in its entirety.

TECHNICAL FIELD

The present invention concerns a charging device, in particular an exhaust gas turbocharger for a motor vehicle, with a wastegate valve device.

BACKGROUND

In conventional exhaust gas turbochargers, which have a wastegate valve device, part of the exhaust gas flowing from the engine outlet can be led past the turbine wheel of the exhaust gas turbocharger. For this purpose, such a turbocharger has a wastegate valve device, which is arranged between the turbine wheel and an inlet opening for the exhaust gases into the turbocharger. This bypassing of exhaust gases, by way of a bypass duct, past the turbine wheel, controlled by the wastegate valve device, takes place as a function of the operating state in question of the internal combustion engine. Such a wastegate valve device usually has a flap that by means of a positioning device is pressed against a duct aperture of the turbine housing, which duct is mounted on a spindle arm, which is non-rotatably connected to the wastegate spindle, such that the flap can open and close the wastegate duct by rotation about the axis of the spindle. In the wastegate valve devices that are currently typical, the flap usually has a flat sealing face, which, in the closed state, abuts against a seating surface of the valve seat, which is also designed to be flat, so as to seal the latter, and thus closes the wastegate duct for the exhaust gases flowing through the turbine. In order to be able to compensate for the thermal distortion caused by thermal stresses in the turbine housing, and the wear caused by friction between the wastegate spindle and the wastegate bushing, the flap of these conventional wastegate valve devices is usually mounted with play on a spindle arm.

In order to avoid annoying acoustic noises, which originate from, amongst other causes, vibrations of the flap excited by exhaust gas pulses, and the associated impacts of the flap on the valve seat or the wastegate spindle, the flap is often spring-loaded against the wastegate spindle, as, for example, in DE 10 2012 216 893 A1.

From JP S56 97530 U a wastegate valve device is of known art, in which a flap fixedly connected to a spindle arm is centred by means of a conical valve seat in the turbine housing and a conical sealing face of the flap, whereby an increase in the radial and axial play between the wastegate spindle and the wastegate bushing ensures a sufficient degree of freedom of the flap, and thus a sealing action between flap and valve seat in an integrated design of flap plate, spindle arm and spindle. This has the advantage that there is naturally no disturbing noise generated as a result of relative movements between the flap plate and the spindle arm.

From JP H06 43227 U a rigidly connected wastegate valve device is also of known art, in which a convex valve body, which is rigidly connected to a spindle arm and a spindle, seals against a conical surface of the valve seat, which likewise leads to improved sealing.

SUMMARY

It is an object of the present invention to specify an improved form of embodiment for a charging device with a wastegate valve device, which is characterised in particular by a simple and cost-effective design.

In accordance with the invention this object is achieved by means of the subject matter of the independent claim(s). Advantageous forms of embodiment are the subject matter of the dependent claim(s).

The basic concept of the invention is therefore to implement the sealing face of the flap of a wastegate valve in terms of a sequence of at least two conical peripheral surfaces arranged next to one another. In particular, this plurality of cones can be arranged with their longitudinal axes coaxial with one another, and can be spaced apart from one another, and the radii of the cones can be selected such that the conical peripheral surfaces merge continuously into one another, whereby the inclination of the cone surfaces, arranged in sequence, increases continuously in the axial direction, as viewed in the direction towards the side of the flap facing the wastegate duct, such that the sealing face of the flap describes a convex shape with respect to the valve seat, whereby the valve seat is formed by a conical surface. By the coaxial arrangement of a plurality of cones, the sealing action can be improved in the event of thermal distortion of the turbine housing, and thus also of the valve seat arranged in the turbine housing, or tilting of the flap caused by play between the wastegate spindle and the bushing, in contrast to the variant embodied in the prior art with only one cone. At the same time, the machining task can be made easier compared to that for the curved sealing face cited in the prior art, as a result of which lower manufacturing costs ensue.

The number of conical sealing faces can vary, whereby a compromise must be found between simple and effective machining, and improved sealing in the event of thermal distortion or tilting of the flap plate caused by wear. It is conceivable and, for the sizes of wastegates used in typical automotive turbochargers, technically feasible, to use wastegates with at least two and at most five conical surfaces. The angles between each pair of conical peripheral surfaces, adjacent in the axial direction, can always be the same, or can differ.

An inventive charging device, in particular an exhaust gas turbocharger for a motor vehicle, comprises a wastegate valve device with a flap, with a spindle arm, with a wastegate spindle, with an axial stop, and with a lever arm non-rotatably attached to the spindle, with which forces for opening and closing can be introduced. The charging device further comprises a wastegate duct, whereby the wastegate spindle is rotatably mounted in a bushing, and the bushing is fixed in a turbine housing such that it can neither rotate nor translate.

The turbine housing comprises the wastegate duct, which is positioned in front of a duct aperture, such that an open end of the wastegate duct forms a duct aperture, which can be closed or opened by rotation of the flap of the wastegate about its axis of rotation. The wastegate duct and the flap are designed and positioned relative to one another such that at any duct opening position of the flap, the flap is positioned at least partially over the duct aperture, whereby in the closed position a sealing face of the flap abuts against a sealing face of the valve seat, and thus closes the duct aperture so as to seal the latter. Here it is an essential feature of the invention that the sealing face of the flap is formed by a plurality of cones. In particular, this plurality of cones is arranged with their longitudinal axes coaxial with one another, and are spaced apart from one another, and the radii of the cones are selected such that the conical peripheral surfaces merge continuously into one another, whereby the inclination of the cone surfaces, arranged in sequence, increases continuously in the axial direction, as viewed in the direction towards the side of the flap facing the wastegate duct, such that the sealing face of the flap describes a convex shape with respect to the valve seat, whereby the valve seat is formed by a conical surface. By the coaxial arrangement of a plurality of cones, the sealing action can be improved in the event of thermal distortion of the turbine housing, and thus also of the valve seat arranged in the turbine housing, or tilting of the flap caused by play between the wastegate spindle and the bushing, in contrast to the variant embodied in the prior art with only one cone. At the same time, the machining task can be made easier compared to that for the curved sealing face cited in the prior art, as a result of which lower manufacturing costs ensue.

Any axial displacement of the flap is limited by one or a plurality of axial stops, whereby a defined axial displacement can be permitted such that the flap can align itself in the valve seat.

In an advantageous configuration it is conceivable that the axial stop is mounted on the outer side of the housing, and limits any displacement of the spindle along its axis both into the interior of the housing and also outwards.

In an advantageous embodiment of the axial stop, the latter is embodied in terms of two separate stops so as to limit the axial displacement of the spindle relative to the bushing both into the interior of the housing and also outwards. Here, the lever arm on the outside of the housing, which is connected to the spindle in a non-rotatably fixed manner, limits any displacement into the interior of the housing, and an inner axial stop, which is formed by studs extending radially from the wastegate spindle, limits any displacement of the spindle outwards. In the event of any displacement of the spindle outwards, the studs, which extend radially outwards from the spindle, abut against an end face of the bushing, that is to say, they make contact with the latter, and thus prevent any further axial movement of the spindle outwards. This allows the spindle to be displaced in the bushing with little axial play if the flap plate is pulled into the conical seat of the valve seat when closing; this enables the wastegate duct to be sealed even in the event of thermal distortion and wear.

The radially extending studs can be evenly distributed in the circumferential direction, or at irregular distances corresponding to the forces to be absorbed from the axial stop.

The number of studs and the contact surface between stud and bushing can be adapted in accordance with the loads applied, and the associated wear between the stud and the end face of the bushing. It is therefore conceivable that there may be embodiments with relatively long studs, where only two studs are located on diametrically opposite sides of the spindle. Alternatively it is also conceivable that a plurality of studs, e.g. four studs, extending relatively little in the radial direction, are distributed in the circumferential direction of the spindle.

Further important features and advantages of the invention ensue from the subsidiary claims, from the figures, and from the related description with reference to the figures.

It is to be understood that the features mentioned above, and those yet to be explained below, can be used not only in the particular combination specified, but also in other combinations, or in isolation, without departing from the scope of the present invention.

Preferred examples of embodiment of the invention are shown in the figures and are explained in more detail in the following description, whereby the same reference symbols refer to the same or similar or functionally identical components.

BRIEF DESCRIPTION OF THE DRAWINGS

Here, in schematic form in each case.

DETAILED DESCRIPTION

Figure 1:
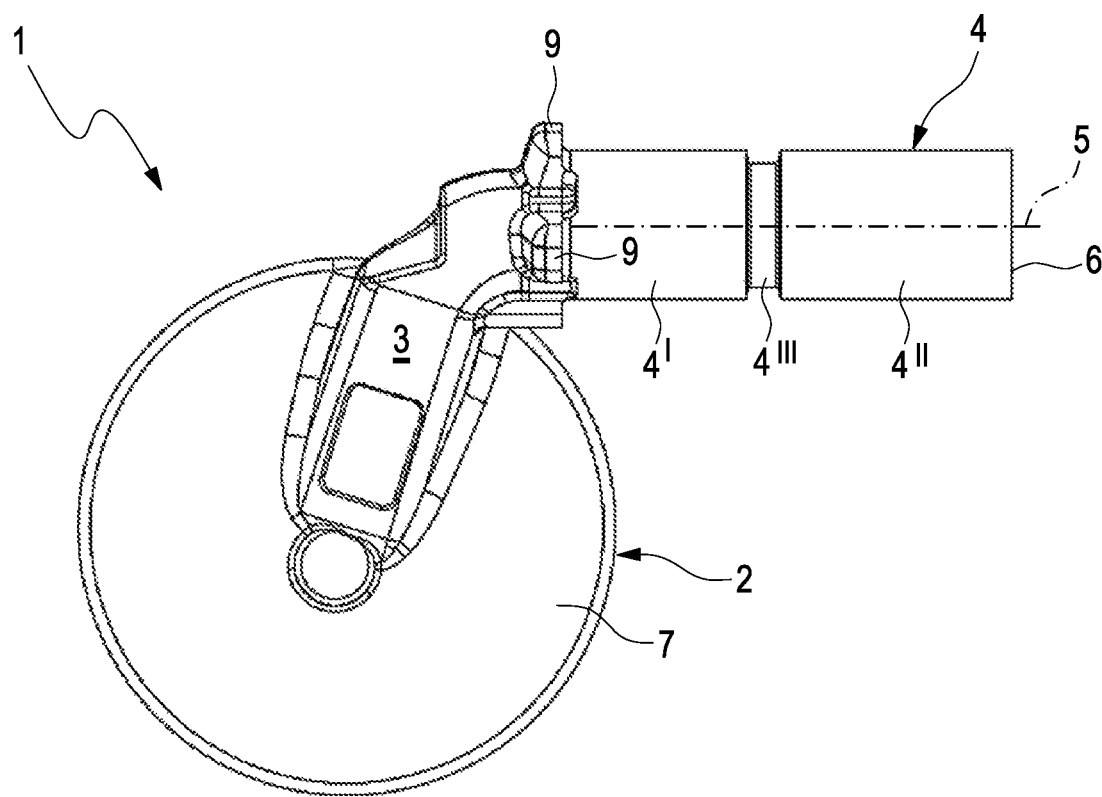
FIG. 1a shows in plan view an integrated design of wastegate valve, comprising a flap, a spindle arm and a spindle with radially extending studs.
FIG. 1b shows the same integrated design of wastegate valve in a side view.
Figure 1:
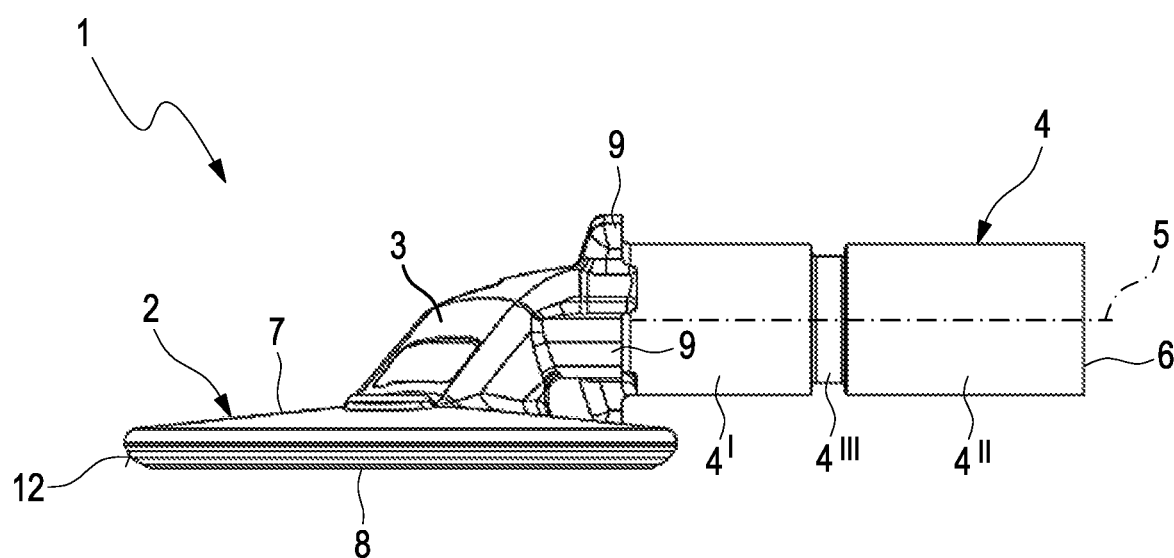

FIGS. 1a and 1b show an integrated design of a wastegate valve of a preferred embodiment of a wastegate valve device 1. The wastegate valve device 1 comprises a flap plate, which is also simply referred to as a flap 2, or a valve body, a spindle arm 3, which extends from the flap plate 2 to an inner end of an essentially cylindrically formed wastegate spindle 4, that is to say, in the installed state of the wastegate valve device 1, an end that projects into the interior of the turbine housing, and fixes these to one another, in particular connects them to one another in a non-rotatable manner, and an inner axial stop 9, which comprises studs $9^I$ to $9^{IV}$ extending radially from the essentially cylindrically formed spindle 4.

In addition to the inner end, the wastegate spindle 4 has an outer end 6, which in the installed state projects from the turbine housing, whereby at the outer end 6 a lever arm (not shown) is non-rotatably connected to the spindle 4, which lever arm transmits, by means of an adjusting rod (not shown) or kinematics, the forces of an actuating device, e.g. a control element or an actuator, onto the wastegate spindle 4 and thus onto the flap plate.

In a preferred form of embodiment, the wastegate spindle 4 can be formed by two spindle bearing surfaces $4^I$ and $4^{II}$ separated by a groove $4^{III}$, which form an inner bearing surface, facing the inner end of the spindle, and an outer bearing surface, facing the outer end 6 of the wastegate spindle 4.

Figure 2:
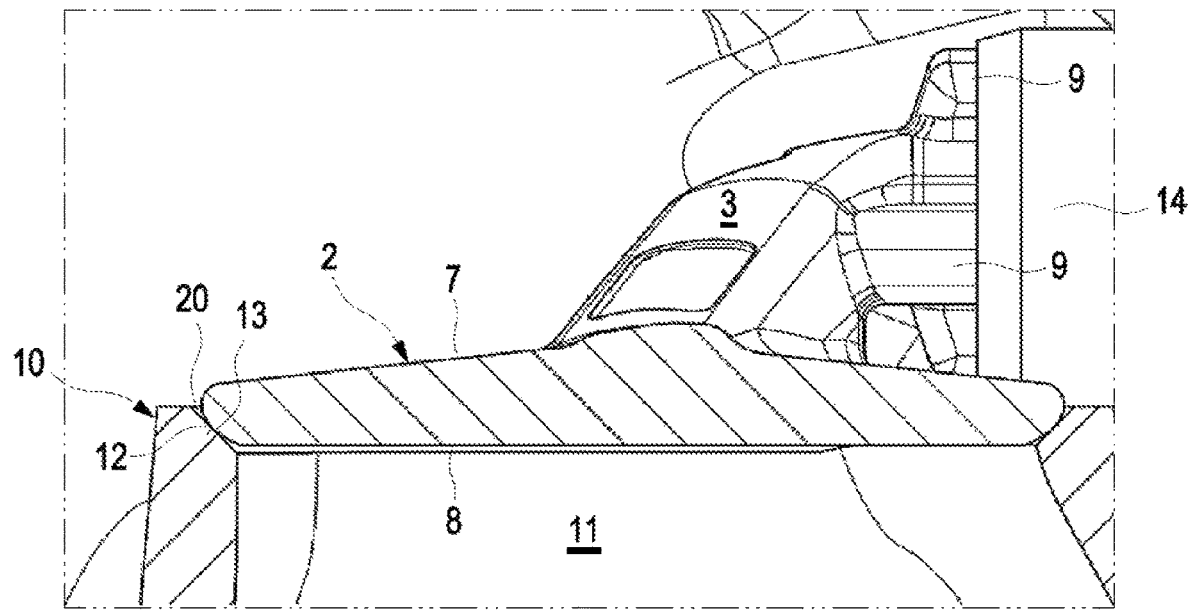
FIG. 2 shows the wastegate valve from FIG. 1, mounted in the turbine housing.

The wastegate spindle 4 is mounted in an essentially cylindrical design of bushing 14 shown in FIG. 2, which can be rotated about its central axis 5 in a turbine housing 10 of the charging device.

A wastegate duct 11 is formed in the turbine housing 10, which has a duct aperture 20 surrounded by a valve seat, which duct aperture, in a closed state, is closed by the flap 2 of the wastegate valve device 1.

The flap 2 of the wastegate valve 1 has an upper side 7, facing away from the wastegate duct 11, and a lower side 8 facing towards the wastegate duct 11, as well as a sealing contour, or sealing face 12, arranged between the upper side 7 and the lower side 8.

Figure 3:
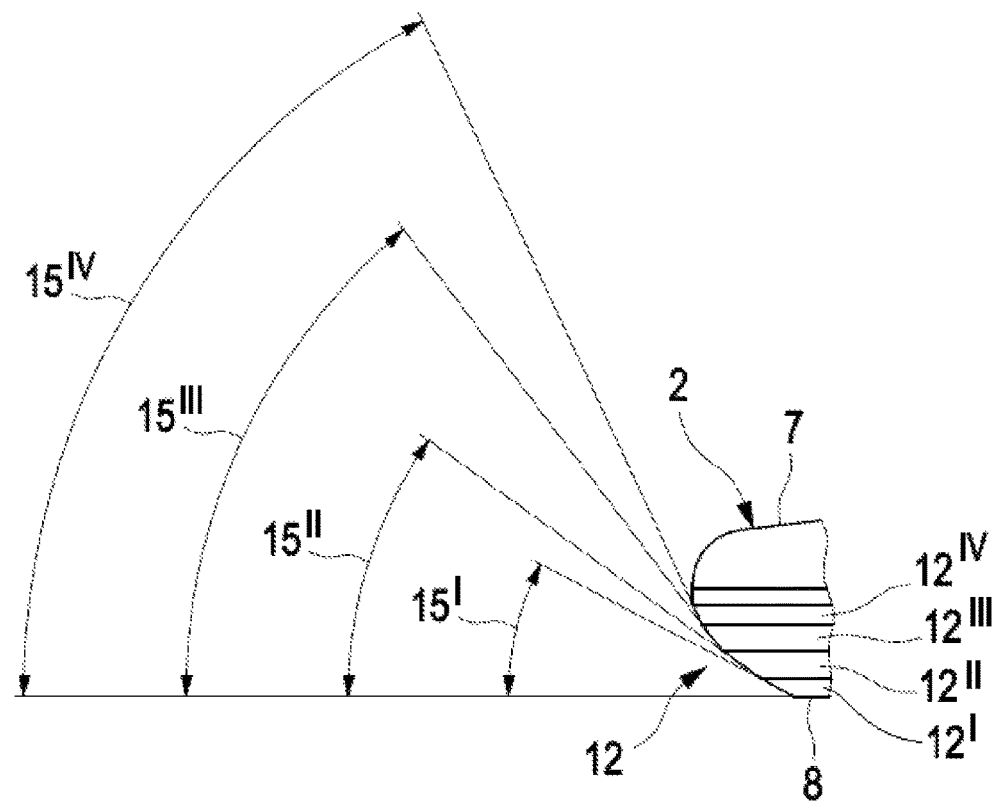
FIG. 3 shows a detail of the multi-conical sealing face of the wastegate valve from FIG. 1.

In accordance with the invention, the sealing face 12, as shown in FIG. 3, is formed by a plurality of cones, axially spaced apart and aligned coaxially with one another. In particular, these several cones are arranged relative to one another and spaced apart from one another, and the radii of the cones are selected such that the conical peripheral surfaces $12^I$ to $12^{IV}$ merge continuously into one another, whereby the inclination of the conical peripheral surfaces $12^I$ to $12^{IV}$, arranged in sequence, increases continuously in the axial direction, as viewed in the direction from the side 8 of the flap 2 facing the wastegate duct, that is to say, from the lower side 8 towards the upper side 7, such that the sealing face 12 of flap 2 describes a convex shape with respect to a valve seat 13 of the wastegate duct 11 that is also of conical design.

The inventive form of embodiment of a multi-conical sealing face 12 in FIG. 3 comprises the peripheral surfaces $12^I$, $12^{II}$, $12^{III}$ and $12^{IV}$, which have angles $15^I$, $15^{II}$, $15^{III}$ and $15^{IV}$ respectively relative to the lower side 8. In accordance with the invention, these angles are selected such that the edge between the central peripheral surfaces $12^{II}$ and $12^{III}$ abuts against a valve seat 13 of the duct aperture of the wastegate duct 11, and the angles $15^{II}$ and $15^{III}$ are larger and smaller respectively by a certain amount than the cone angle of the sealing face of the valve seat 13, that is to say, for example, 35° and 55° for a cone angle of the sealing face of the valve seat 13 of 45°.

Figure 4:
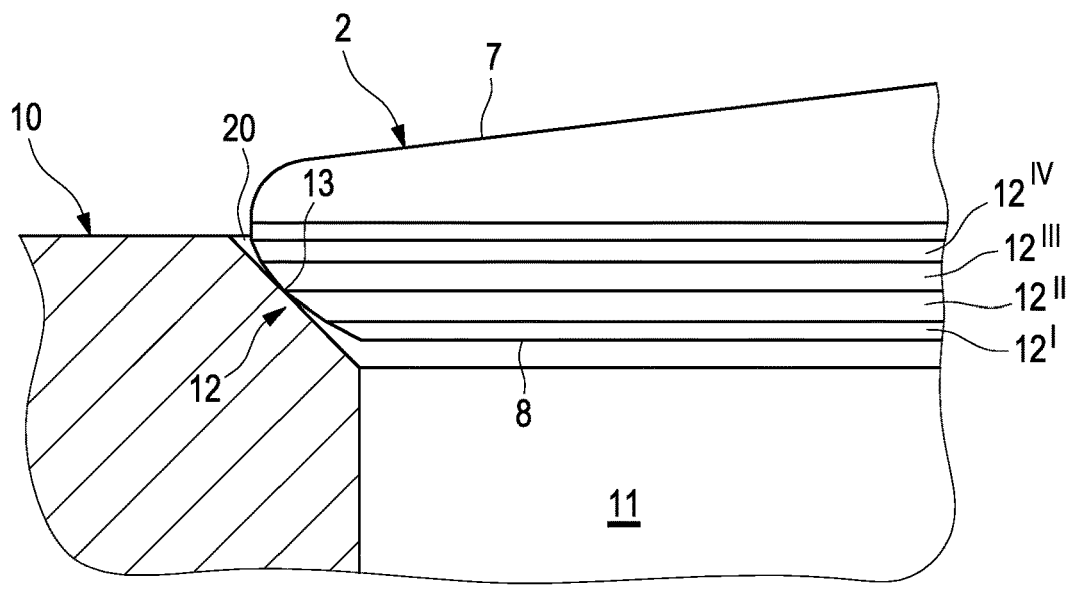
FIG. 4 shows a detail of the multi-conical sealing face of the wastegate valve from FIG. 1, which abuts against a conical sealing face of the valve seat.

FIG. 4 shows how the sealing face 12 of the flap 2 abuts against the conical design of valve seat 13. Here the outer peripheral surfaces $12^I$ and $12^{IV}$ can be inclined such that they have a positive effect on the outflow of the exhaust gas flowing out of the wastegate duct 11 from a duct aperture of the wastegate valve device 1, in that, for example, they set the clearance provided between the valve seat 13 and the sealing face 12 in accordance with the desired duct aperture characteristics.

Figure 5:
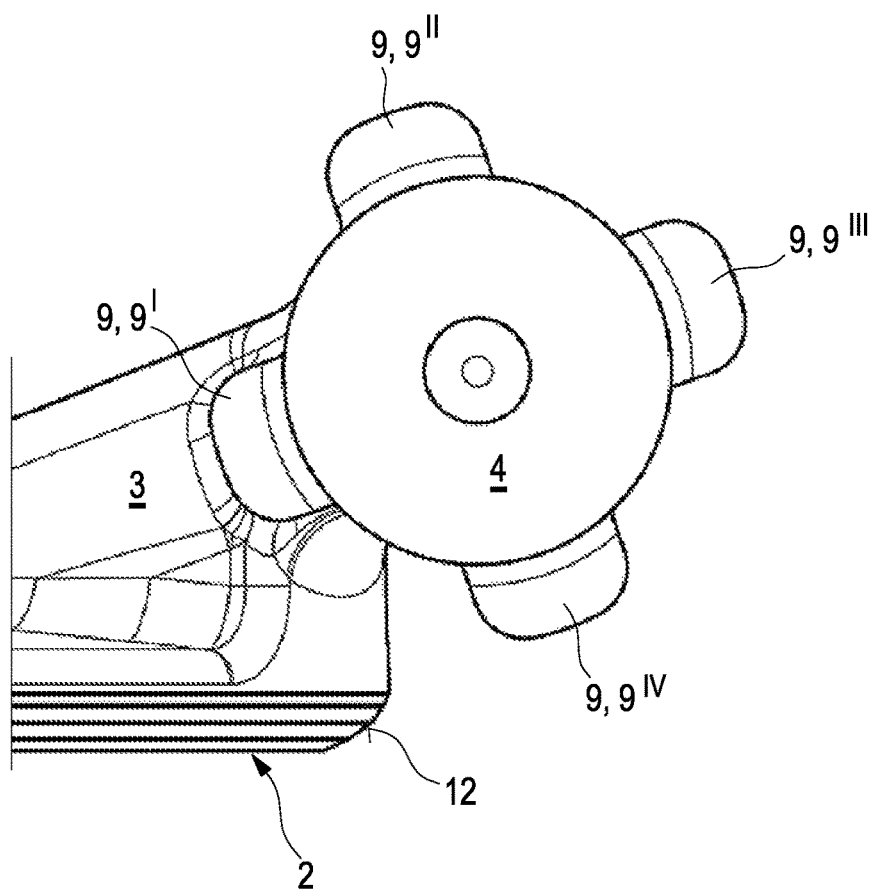
FIG. 5 shows an illustration of the axially extending studs, as viewed in the direction of the spindle axis.

FIG. 5 shows the studs $9^I$ to $9^{IV}$ extending radially from the wastegate spindle 4 as viewed in the direction of the central axis 5 of the wastegate spindle 4. In the inventive form of embodiment as shown, the studs $9^I$ to $9^{IV}$ are evenly spaced apart in the circumferential direction, whereby the angular range in the circumferential direction covered by the studs $9^I$ to $9^{IV}$ corresponds to approximately 180°.

The invention concerns a charging device, in particular an exhaust gas turbocharger for a motor vehicle, with a wastegate valve device. Such a wastegate valve device has an inner axial stop, which is formed by studs extending radially outwards from the wastegate spindle, which limit any outward displacement of the spindle. In the present wastegate valve it is an essential feature of the invention that the sealing face of the flap plate is formed by a plurality of cones, axially spaced apart and aligned coaxially with one another. In particular, these several cones are arranged relative to one another and spaced apart from one another, and the radii of the cones are selected such that the conical peripheral surfaces merge continuously into one another, whereby the inclination of the conical peripheral surfaces, arranged in sequence, increases in the axial direction, that is to say, from the lower side of the flap towards the upper side of the flap, such that the sealing face of the flap describes a convex shape with respect to a valve seat of the wastegate duct that is also of conical design.

The invention claimed is:

1. A charging device, comprising:
a turbine housing;
a wastegate valve device including a flap, a spindle arm, a wastegate spindle, an axial stop, and a lever arm non-rotatably attached to the wastegate spindle;
the wastegate spindle rotatably mounted in a bushing disposed on the turbine housing;
a wastegate duct disposed in the turbine housing, the wastegate duct having a duct aperture enclosed by a valve seat;
wherein a sealing face of the flap is defined by a sequence of a plurality of conical peripheral surfaces arranged next to one another and each extending at a different inclination relative to a lower side of the flap facing the duct aperture;
wherein the sealing face includes a plurality of circumferentially extending edges;
wherein adjacent edges of the plurality of edges are separated from one another by a respective conical surface of the plurality of conical peripheral surfaces; and
wherein, when in a closed state, at least one edge of the plurality of edges abuts a conical surface of the valve seat such that the duct aperture is closed by the flap of the wastegate valve device.

2. The charging device in accordance with claim 1, wherein an inclination of each of the plurality of conical peripheral surfaces, arranged in sequence, increases towards the wastegate spindle.

3. The charging device in accordance with claim 1, wherein two adjacent conical peripheral surfaces of the plurality of conical peripheral surfaces merge continuously into one another.

4. The charging device in accordance with claim 1, wherein the plurality of conical peripheral surfaces provide a convex geometric shaping of the sealing face of the flap.

5. The charging device in accordance with claim 1, wherein
the plurality of conical peripheral surfaces each define a respective angle with respect to the lower side of the flap.

6. The charging device in accordance with claim 5, wherein the respective angle of at least one of the plurality of conical peripheral surfaces is greater or smaller by a predetermined amount than a cone angle of a sealing face of the valve seat.

7. The charging device in accordance with claim 1, wherein the axial stop includes an inner stop formed by at least two studs projecting radially outwards from the wastegate spindle which are arranged spaced apart from one another along a circumferential direction of the wastegate spindle.

8. The charging device in accordance with claim 7, wherein the at least two studs includes at least three studs disposed equidistant from one another in the circumferential direction.

9. The charging device in accordance with claim 1, wherein the axial stop includes an outer stop defined by the lever arm.

10. The charging device in accordance with claim 1, wherein the plurality of conical peripheral surfaces are disposed coaxially.

11. The charging device in accordance with claim 1, wherein the plurality of conical peripheral surfaces are arranged directly axially adjacent to one another and contact one another such that the plurality of edges are each defined by a pair of adjacent conical surfaces of the plurality of conical peripheral surfaces.

12. The charging device in accordance with claim 1, wherein:
the plurality of conical peripheral surfaces are arranged in sequence along a common central axis; and
an inclination angle between a respective one of the plurality of conical peripheral surfaces and a plane perpendicular to the common central axis sequentially increases by a constant amount in a direction towards the wastegate spindle such that a difference between the inclination angle of adjacent conical surfaces of the plurality of conical peripheral surfaces is the same for each pair of adjacent conical surfaces.

13. The charging device in accordance with claim 1, wherein:
the plurality of conical peripheral surfaces are arranged in sequence along a common central axis;
the plurality of conical peripheral surfaces includes an upper conical peripheral surface and a lower conical peripheral surface, the upper conical peripheral surface disposed axially closer to the wastegate spindle than the lower conical peripheral surface;
the upper conical peripheral surface and the lower conical peripheral surface contact one another to define the at least one edge;
the conical surface of the valve seat is inclined by a first inclination angle relative to a plane perpendicular to a central cone axis of the conical surface of the valve seat;
a second inclination angle of the upper conical peripheral surface relative to the plane is larger than the first inclination angle; and
a third inclination angle of the lower conical peripheral surface relative to the plane is smaller than the first inclination angle.

14. The charging device in accordance with claim 1, wherein the wastegate spindle has an inner end disposed within an interior of the turbine housing and an outer end disposed outside of the turbine housing.

15. The charging device in accordance with claim 1, wherein the wastegate spindle has two circumferential spindle bearing surfaces separated by a circumferentially extending groove.

16. The charging device in accordance with claim 1, wherein the flap has an upper side facing away from the wastegate duct, and wherein the sealing face of the flap is disposed between the lower side and the upper side.

17. The charging device in accordance with claim 1, wherein the charging device is an exhaust gas turbocharger for a motor vehicle.

18. The charging device in accordance with claim 1, wherein: in a longitudinal cross-section of the flap, the respective conical surface of the plurality of conical peripheral surfaces is linear; and the respective conical surface of the plurality of conical peripheral surfaces extends between the adjacent edges.

19. The charging device in accordance with claim 1, wherein:
the plurality of conical peripheral surfaces are arranged in sequence along a common central axis; and
an inclination angle between a respective one of the plurality of conical peripheral surfaces and the common central axis sequentially decreases in a direction towards the wastegate spindle such that a difference between the inclination angle of adjacent conical surfaces of the plurality of conical peripheral surfaces is different for each pair of adjacent conical surfaces.

20. A charging device, comprising:
a turbine housing;
a wastegate valve device including a flap, a spindle arm, a wastegate spindle, an axial stop, and a lever arm non-rotatably attached to the wastegate spindle;
the wastegate spindle rotatably mounted in a bushing disposed on the turbine housing;
a wastegate duct disposed in the turbine housing, the wastegate duct having a duct aperture enclosed by a valve seat;
the flap having an upper surface facing away from the wastegate duct, a lower surface facing towards the wastegate duct, and a plurality of conical portions disposed directly one after the other between the upper surface and the lower surface;
each of the plurality of conical portions having one of a plurality of coaxial conical peripheral surfaces disposed axially one after another, the plurality of conical wherein the plurality of conical peripheral surfaces collectively define a convex shaped sealing face of the flap;
wherein the sealing face includes a plurality of circumferentially extending edges;
wherein adjacent edges of the plurality of edges are separated from one another by a respective conical surface of the plurality of conical peripheral surfaces; and
wherein, when in a closed state, at least one edge of the plurality of edges abuts a conical surface of the valve seat such that the duct aperture is closed by the flap of the wastegate valve device.

21. A charging device, comprising:
a turbine housing including a wastegate duct having a duct aperture enclosed by a valve seat;
a wastegate valve device including a flap, a wastegate spindle having an inner end disposed within an interior of the turbine housing and an outer end disposed outside of the turbine housing, a spindle arm extending between the flap and the inner end of the wastegate spindle, an axial stop limiting axial displacement of the flap relative to the valve seat, and a lever arm non-rotatably attached to the wastegate spindle;
the wastegate spindle rotatably mounted in a bushing disposed on the turbine housing;
wherein a sealing face of the flap is defined by a sequence of at least two conical peripheral surfaces arranged next to one another along a common central axis and each having a different inclination angle relative to the common central axis;
wherein the at least two conical peripheral surfaces are arranged directly axially adjacent to one another and contact one another to define a circumferentially extending edge;
wherein, when in a closed state, the circumferentially extending edge abuts a conical surface of the valve seat such that the duct aperture is closed by the flap of the wastegate valve device; and
wherein, when in the closed state, an inclination angle of the conical surface of the valve seat relative to the common central axis differs from the inclination angle of each of the at least two conical peripheral surfaces by the same amount.

* * * * *